United States Patent
Ames

(10) Patent No.: US 8,739,676 B2
(45) Date of Patent: Jun. 3, 2014

(54) VEHICLE OCCUPANT BLAST ISOLATION SYSTEM

(71) Applicant: Raytheon Company, Waltham, MA (US)

(72) Inventor: Richard Gene Ames, Tucson, AZ (US)

(73) Assignee: Raytheon Company, Waltham, MA (US)

(*) Notice: Subject to any disclaimer, the term of this patent is extended or adjusted under 35 U.S.C. 154(b) by 52 days.

(21) Appl. No.: 13/647,856

(22) Filed: Oct. 9, 2012

(65) Prior Publication Data

US 2014/0096672 A1      Apr. 10, 2014

(51) Int. Cl.
*F41H 11/00*      (2006.01)

(52) U.S. Cl.
USPC ............. 89/36.08; 89/36.17; 342/70; 701/45

(58) Field of Classification Search
CPC ............ B60R 2021/0018; B60R 2021/01327; B60R 21/01; B60R 21/0132; B60R 99/00; B60G 2202/45; B60G 2202/49; B60G 2800/9124; B62D 39/00; F02K 9/00; F05B 2240/94; F05B 2240/91; F41B 9/0087; F41H 13/00; F41H 5/007; F41H 7/042

USPC ........ 89/36.08, 903, 918, 930; 280/6.15, 748, 280/755; 297/216.1; 180/282; 244/122 A, 244/122 AH, 122 R

See application file for complete search history.

(56) References Cited

U.S. PATENT DOCUMENTS

| | | | |
|---|---|---|---|
| 6,938,924 B2 * | 9/2005 | Feldman et al. | 280/755 |
| 2005/0230176 A1 * | 10/2005 | Wang | 180/282 |
| 2013/0204496 A1 * | 8/2013 | Sloman | 701/45 |
| 2013/0328713 A1 * | 12/2013 | Svane et al. | 342/70 |

* cited by examiner

*Primary Examiner* — Samir Abdosh
*Assistant Examiner* — John D Cooper
(74) *Attorney, Agent, or Firm* — Eric A. Gifford

(57) ABSTRACT

A vehicle occupant blast isolation system uses small explosive charges and small rocket motors to isolate vehicle occupants from blast loads. The system initiates the explosive charges to remove all mechanical linkages between the occupants and the initial shock so that no shock effects are transferred. The system counteracts the effects of the impulse by igniting the rocket motors to provide a restoring force to counter the effects of the impulse load. This combination of mechanical isolation and impulse negation addresses both the high-frequency initial shock and low-frequency impulse effects from explosive devices.

12 Claims, 8 Drawing Sheets

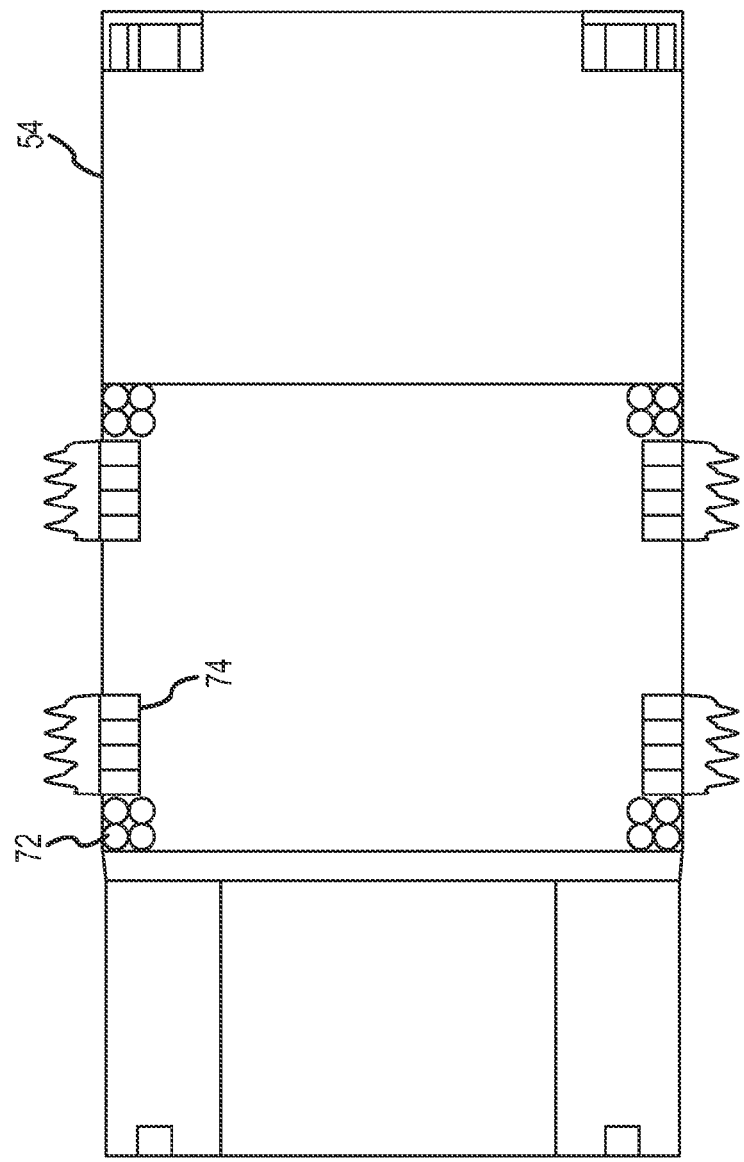

VEHICLE OCCUPANT BLAST ISOLATION SYSTEM

BACKGROUND OF THE INVENTION

1. Field of the Invention

This invention relates to measures for isolating vehicle occupants from blast effects due to mines, roadside bombs, rockets improvised explosive devices (IEDs), and other explosive devices.

2. Description of the Related Art

Mines, roadside bombs, rockets, improvised explosive devices (IEDs), and other explosive devices pose a major threat to vehicle occupants. Blast loads transmitted through vehicle structures and rigid body motion of the vehicle structure due to blast impulse combine to create a high likelihood of serious injury for vehicle occupants. Tremendous resources have been expended to detect and disable IEDs and related explosive devices. This is a very difficult problem and success has been limited.

As shown in FIGS. 1 and 2 a vehicle 10 includes a body structure 12 and a seat 14 for an occupant 16. Detonation of an explosive device produces a blast wave 18. A high-frequency shock component 20 of the blast wave travels through the body structure 12 and seat 14 directly to the occupant 16. A low-frequency impulse component 22 of the blast wave is coupled to the body structure 12 that can 111$f$ and flip the vehicle. The shock component 20 represents the initial rise in pressure P of the blast wave and last for a few microseconds. The impulse component 22 represents the integral of the pressure wave P over several milliseconds.

The current state-of-the-art to counter blast effects focuses on energy absorption. A structure 24 that supports seat 14 is configured to form a "crumple zone" similar to the front end of most automobiles. The crumple zone reduces the initial high-frequency shock that is coupled directly to the occupant. The crumple zone cannot be 100% effective against the initial shock because energy and momentum must be conserved. Considerable energy is still transmitted through the mechanical linkage of the crumple zone to the occupant. Furthermore, the crumple zone does nothing to counter the low-frequency impulse effect that may lift and flip the vehicle.

SUMMARY OF THE INVENTION

The following is a summary of the invention in order to provide a basic understanding of some aspects of the invention. This summary is not intended to identify key or critical elements of the invention or to delineate the scope of the invention. Its sole purpose is to present some concepts of the invention in a simplified form as a prelude to the more detailed description and the defining claims that are presented later.

The present invention provides a vehicle occupant blast isolation system uses small explosive charges and small rocket motors to isolate vehicle occupants from blast loads. The system initiates the explosive charges to remove all mechanical linkages between the occupants and the initial shock so that no shock effects are transferred. The system counteracts the effects of the impulse by igniting the rocket motors to provide a restoring force to counter the effects of the impulse load. This combination of mechanical isolation and impulse negation addresses both the high-frequency initial shock and low-frequency impulse effects from explosive devices.

In an embodiment, a vehicle occupant blast isolation system comprises one or more blast sensors positioned on the body structure to detect a blast wave of an explosive event proximate the vehicle. One or more explosive charges are positioned on the seat support structure. A first circuit is coupled to the one or more sensors to initiate the explosive charges in response to a detected blast wave. The initiation of the explosive charges severs the mechanical linkage between the seat and body structure placing the seat and occupant in free-fall for a period of time spanning the coupling of the shock from the blast wave to the body structure. A plurality of rocket motors is positioned about the vehicle's body structure. One or more motion sensors are positioned on the body structure to measure rotation and typically translation of the body structure. A second circuit is coupled to the one or more blast sensors and the one or more motion sensors to initiate one or more of the rocket motors in response to the detected blast wave and the measured rotation and typically translation of the body structure to produce a restoring force to counter the rotation and possibly translation.

In another embodiment, the system does not include the motion sensors. The second circuit initiates the rocket motors solely in response to the detection of the blast wave to produce a fixed nominal restoring force to counter the rotation of the body structure.

In an embodiment, the system includes only blast sensors, explosive charges and the first circuit to isolate the occupant from the high-frequency initial shock.

In an embodiment, the system includes sensors to detect the blast wave and measure rotation of the vehicle, a plurality of rocket motors and a circuit to initiate the rocket motors to produce a restoring force adapted to counter the measured vehicle rotation. This system may include no means for isolating the occupant from the high-frequency shock. Alternately, the system may include the described means for severing the linkage to put the occupant in free fall or may include means such as a "crumple zone" for absorbing some of the high-frequency shock.

These and other features and advantages of the invention will be apparent to those skilled in the art from the following detailed description of preferred embodiments, taken together with the accompanying drawings, in which:

BRIEF DESCRIPTION OF THE DRAWINGS

FIGS. 3a through 3c are side and top views and a block diagram of a vehicle outfitted with an embodiment of a vehicle occupant blast isolation system to counter both the initial high-frequency shock and low-frequency impulse effects of the blast wave;

DETAILED DESCRIPTION OF THE INVENTION

The present invention provides a vehicle occupant blast isolation system that uses small explosive charges and small rocket motors to isolate vehicle occupants from blast loads.

The system initiates the explosive charges to remove all mechanical linkages between the occupants and the initial shock so that no shock effects are transferred. The system counteracts the effects of the impulse by igniting the rocket motors to provide a restoring force to counter the effects of the impulse load. This combination of mechanical isolation and impulse negation addresses both the high-frequency initial shock and low-frequency impulse effects from explosive devices.

Figure 1:
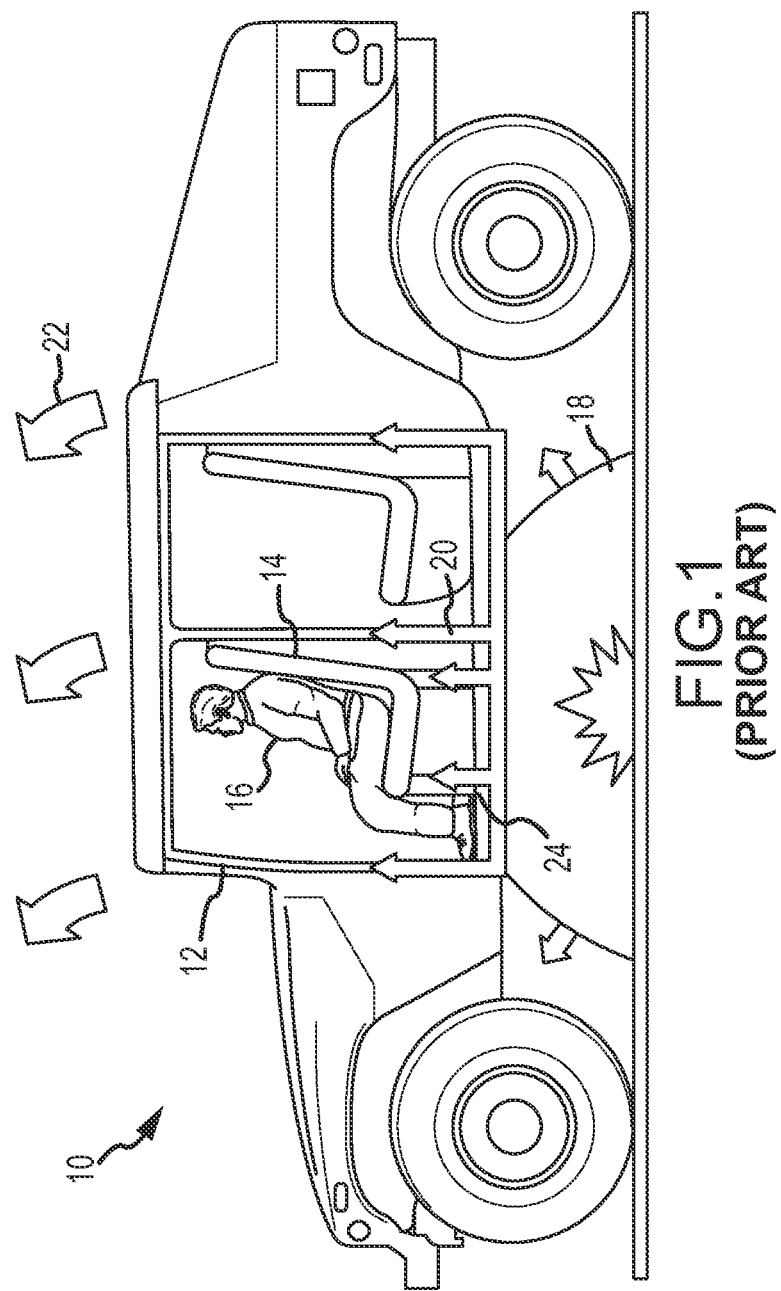
FIG. 1, as described above, is a diagram of a vehicle subjected to the blast wave from an explosive device.
Figure 2:
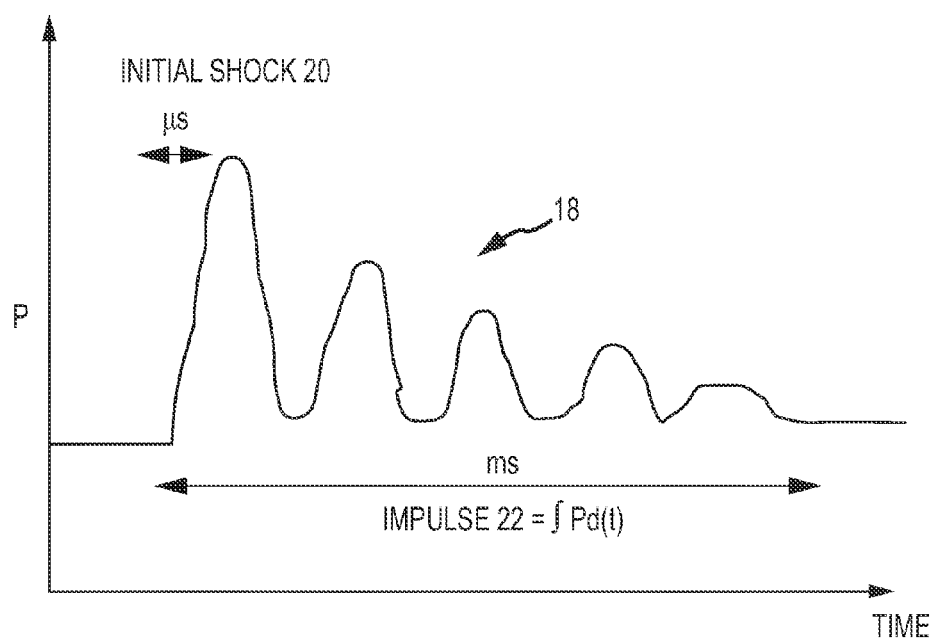
FIG. 2, as described above, is a diagram of a blast wave including the initial high-frequency shock and the low-frequency impulse.
Figure 3A:
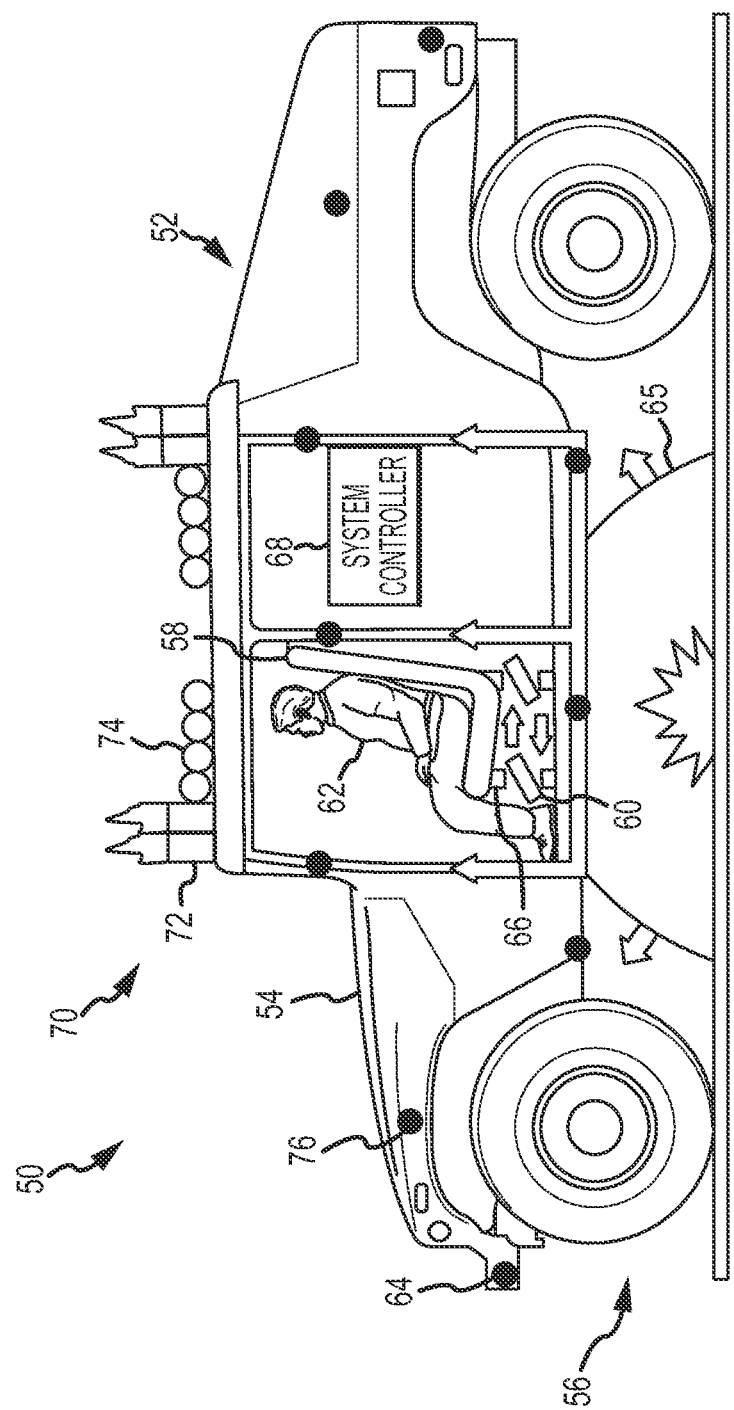
Figure 3C:
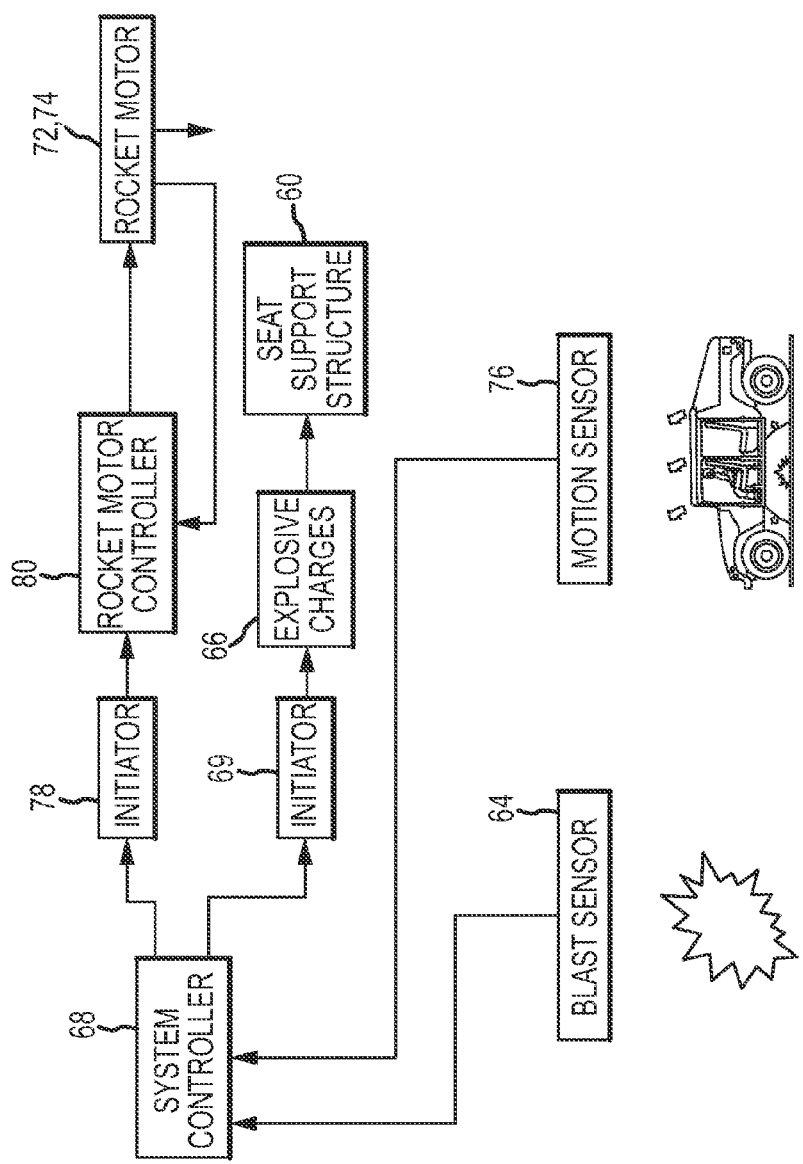

Referring now to FIGS. 3a, 3b and 3c, an embodiment of a vehicle occupant blast isolation system 50 for a vehicle 52 uses small explosive charges and small rocket motors to isolate vehicle occupants from blast loads. Vehicle 52 comprises a body structure 54, wheels 56 (or tracks), an occupant seat 58 and a seat support structure 60 that provides a mechanical linkage between the vehicle and an occupant 62. The depicted vehicle is exemplary only, the vehicle occupant blast isolation system can be used with any type of wheeled or tracked vehicle, boats etc. The system may be retrofitted to existing vehicles or designed in to new vehicles.

The vehicle occupant blast isolation system 50 comprises one or more blast sensors 64 positioned on the body structure 54 to detect a blast wave 65 of an explosive event (e.g. detonation of an explosive device) proximate the vehicle. Blast sensors 64 may include photosensors that detect the flash of light that accompanies the explosive event or accelerometers that detect the initial shock of the blast wave. The initial shock may be on the order of thousands or tens of thousands of gs, where "gs" is common terminology for a unit of acceleration referenced to Earth gravity. One or more explosive charges 66 are positioned on the seat support structure 60. The small explosive charges 66 can be explosive cores (detonating cord) down the length of the seat support structure or linear shaped charges that cut through those structures.

A system controller 68 is coupled to the one or more blast sensors 64. The system controller monitors the amplitude and rise time of the signals output by the blast sensors 64 to determine if an explosive event proximate the vehicle has occurred and to generate an initiation command. The initiation command is coupled to an initiator 69 to initiate the explosive charges 66 in response to the detected blast wave 65. The initiation of the explosive charges 66 severs the mechanical linkage between the seat 58 and body structure 54 placing the seat and occupant 62 in free-fall for a period of time spanning the coupling of the shock from the blast wave to the body structure. The mechanical linkages can be severed in approximately 2.0 ms from initiation and 2.5 ms from the explosive event, which is sufficient to put the occupant into free-fall before the initial shock is coupled through to the occupant. The occupant remains in free-fall for approximately 250 ms, which is sufficient to allow the shock to reverberate through the body structure and decay to safe levels. Shock speeds in the body structure are many kilometers per second so only 10s of milliseconds of isolation are required.

To counteract the effects of the impulse from blast wave 65, a plurality of rocket motors 70 are positioned about the vehicle's body structure 54. In this particularly embodiment, the rocket motors 70 includes both vertical rocket motors 72 and lateral rocket motors 74 positioned at the four corners on the roof of body structure 54. In this embodiment, the rocket motors provide a specific impulse once initiated. To provide flexibility in either the total impulse at a given corner or the timing of multiple impulses the vertical and lateral rocket motors are array in groups of four. Some applications may have a single rocket motor while others may have more than four. Rocket motors that provide a controllable impulse may be used but are considerably more complex, hence expensive.

One or more motion sensors 76 are positioned on the body structure 54 to measure rotation and possibly translation of the body structure. The sensors may be positioned at the same or different locations as the blast sensors. These motion sensors 76 may include conventional gyros or accelerometers. The rotation of the body structure may be on the order of 10s of gs. Given the great disparity in the accelerations associated with the initial shock detection and the rotation of the body structure (at minimum a couple orders of magnitude), it is probably easier and less expensive to use two different sets of accelerometers to measure the initial shock and body rotation separately. However, it may be possible to provide an integrated accelerometer that is capable of making both measurements. These sensors will typically also provide a measurement of translation of the vehicle e.g. forward/backward, side-to-side or up and down.

System controller 68 is coupled to the one or more motion sensors 76. The system controller monitors the signals output by the motion sensors 76 to determine the rotation and translation of the vehicle and, if warranted, to determine an appropriate restoring force and to generate one or more initiation commands. The one or more initiation commands are coupled to one or more initiator 78 to initiate a rocket motor controller 80 that fires the one or more of the rocket motors 72 and 74 to produce a restoring force to counter the rotation. In an embodiment, the system controller is only enabled to fire the rocket motors to compensate for vehicle motion if an explosive event has occurred. In another embodiment, the system controller may be enabled to fire the rockets if the motion of the vehicle itself warrants a correction. The system controller may initiate one set of the rocket motors in response to a single measurement of body rotation to counter the rotation. Alternately, the system controller may initiate different sets of the rocket motors in response to a time sequence of rotation measurements. The firing solution may also counter any undesired translation of the vehicle.

In an alternate embodiment, the system may not include any motion sensors. Instead the second circuit initiates a pre-determined set of rocket motors at a pre-determined delay from the detection of the blast wave to produce a pre-determined and nominal restoring force to counter the rotation. The number, placement and specific impulse of the rocket motors is determined so that the nominal restoring force will typically pin the vehicle to the ground. In some cases, the force may be a bit excessive and in others in sufficient to counter all translation and rotation of the vehicle.

Figure 4:
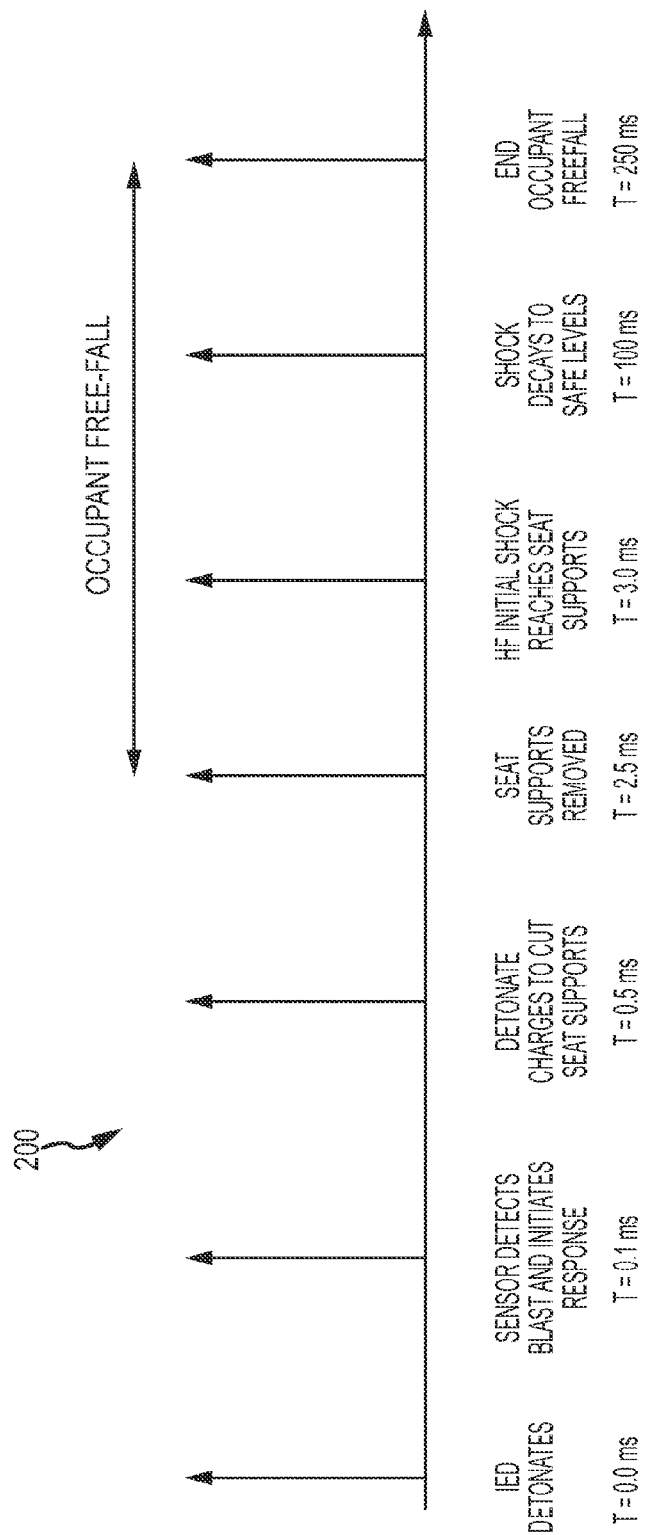
FIG. 4 is a timing diagram for the system response to the initial high-frequency shock.

FIG. 4 is a timing diagram 200 of an exemplary embodiment to detect the blast wave and initiate the explosives to sever the mechanical linkages to the seat and place the occupant in free-fall. The exact timing will depend on the proximity of the IED. The sensors will provide the appropriate signals at the appropriate times to initiate the explosives and sever the linkages. In this embodiment, the explosive device detonates producing an explosive event proximate the vehicle at t=0.0 ms. The blast sensors detect the blast wave at t=0.1 ms and initiate a response. The system controller initiates the explosive charges to sever the seat supports at t=0.5 ms. By t=2.5 ms the seat supports and any mechanical linkages to the occupant have been removed and the occupant is placed in free-fall. At t=3.0 ms the high-frequency initial shock of the blast wave reaches the seat supports (which have been severed). The shock reverberating in the body structure decays to save levels at t=100 ms and occupant free-fall ends at t=250 ms. The occupant(s) fall to the floor of the vehicle in their seat but are spared the g forces of the initial shock of the blast wave.

Figure 5:
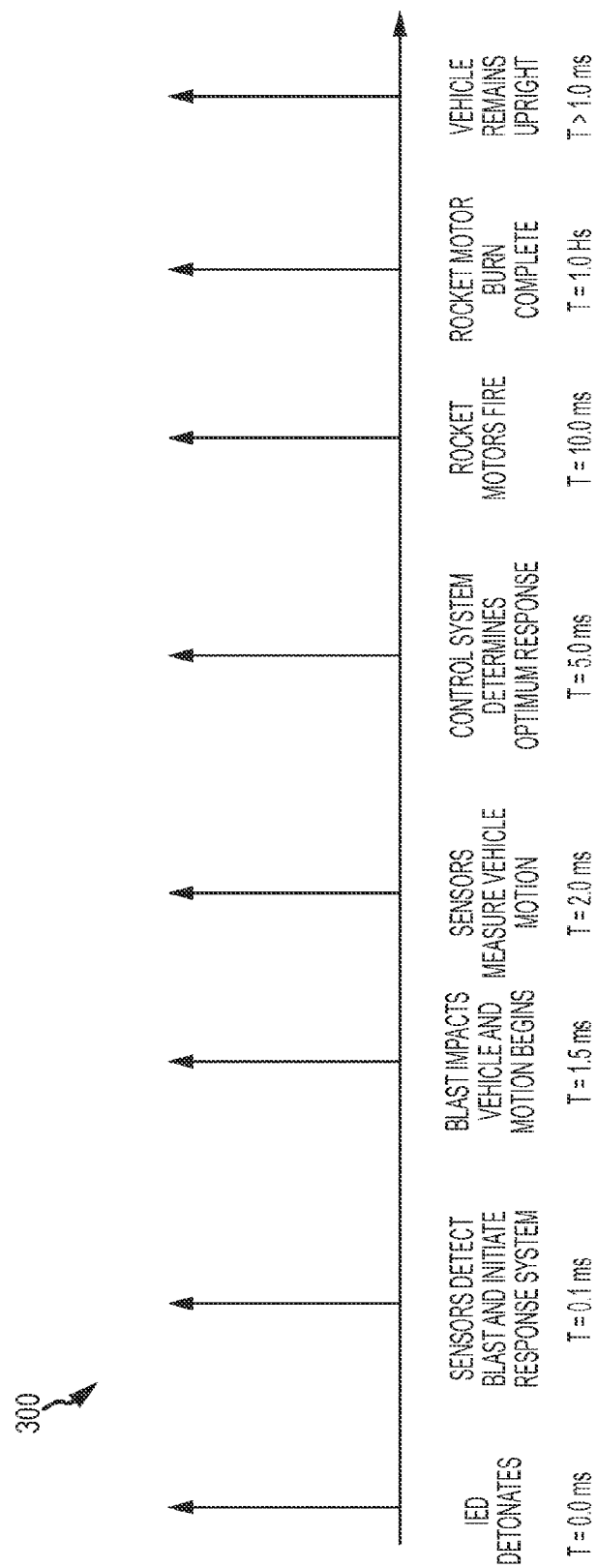
FIG. 5 is an embodiment of a timing diagram in which the system response is adapted to measured vehicle rotation rates in response to the low-frequency impulse.

FIG. 5 is a timing diagram 300 of an exemplary embodiment to detect the blast wave and vehicle motion, determine an optimum response and initiate the rockets to produce a restoring force to counter the motion (e.g. rotation and translation) of the vehicle. The exact timing will depend on the proximity of the IED. The sensors will provide the appropriate signals at the appropriate times to fire the rocket motors. In this embodiment, the explosive device detonates producing an explosive event proximate the vehicle at t=0.0 ms. The blast sensors detect the blast wave at t=0.1 ms and initiate a response. The impulse of the blast wave impacts the vehicle and motion begins at t=1.5 ms. The motion sensors measure vehicle motion starting at t=2.0 ms. At t=5.0 ms the system controller determines an optimum response to counter the measured vehicle motion and fires a set of rocket motors starting at t=10.0 ms. Rocket motor burn is complete at t=1.0 s and the vehicle remains upright. The blast event typically lasts no longer than several milliseconds after arriving at the vehicle. Typically, the rotation sensors will output measurements either continuously or at a very high clock rate. The system controller may compute and execute a single firing solution to counter the measured rotation or may compute a sequence of firing solutions to fire different sets of rockets to counter the measured rotation.

Figure 6:
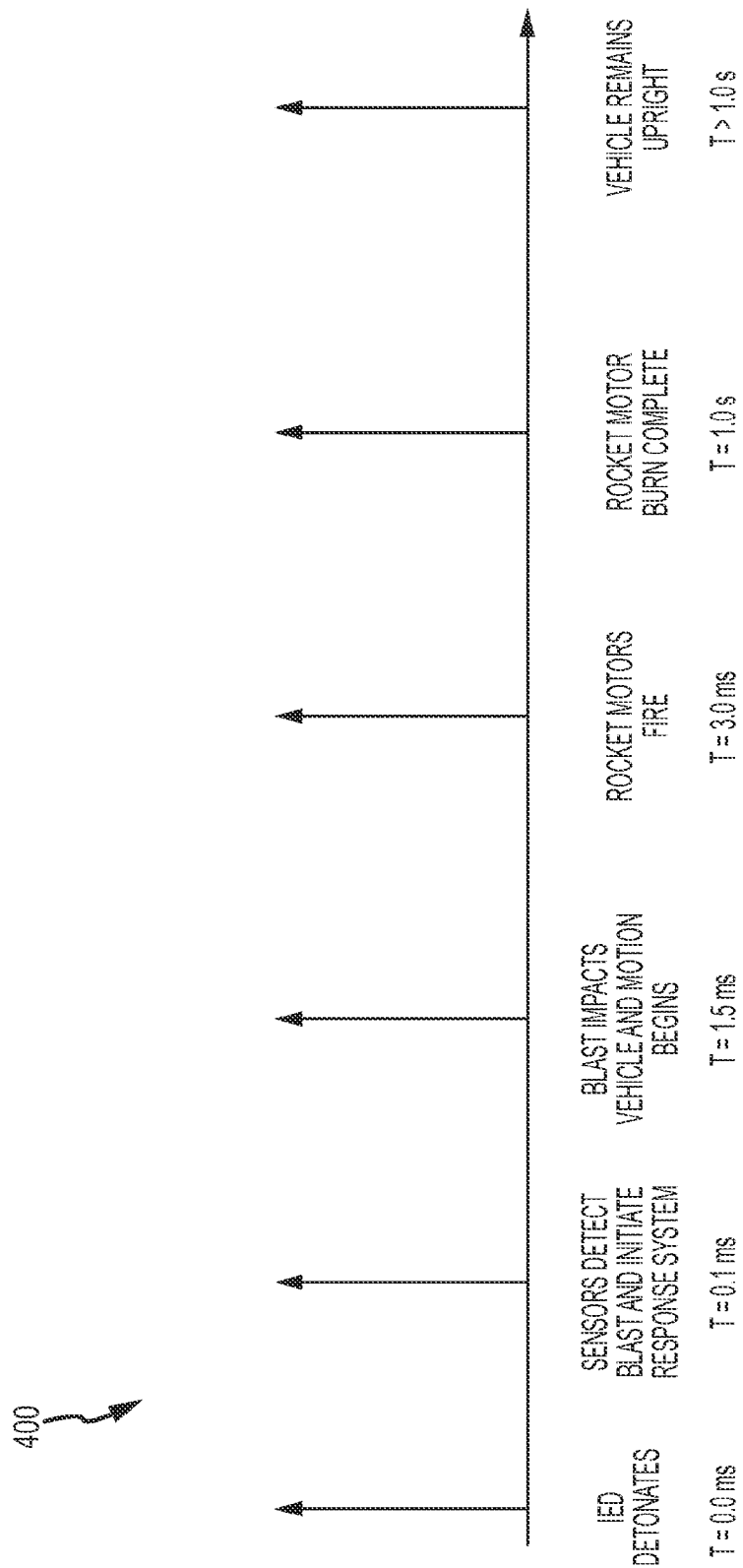
FIG. 6 is an embodiment of a timing diagram in which a nominal system response is used to counter any vehicle rotation in response to the low-frequency impulse.

FIG. 6 is a timing diagram 400 of an exemplary embodiment to detect the blast wave and fire the rockets to produce a pre-determined nominal restoring force to counter the motion (e.g. rotation and translation) of the vehicle. The exact timing will depend on the proximity of the explosive device. The blast sensors will provide the appropriate signals to initiate a response. The system controller will typically delay firing the rocket motors by a fixed delay to allow vehicle motion to commence prior to rocket firing. In this embodiment, the explosive device detonates producing an explosive event proximate the vehicle at t=0.0 ms. The blast sensors detect the blast wave at t=0.1 ms and initiate a response. The impulse of the blast wave impacts the vehicle and motion begins at t=1.5 ms. The system controller fires a pre-determined set of rocket motors starting at t=3.0 ms to produce the pre-determined nominal restoring force. Rocket motor burn is complete at t=1.0 s and the vehicle remains upright. The blast event typically lasts no longer than several milliseconds after arriving at the vehicle.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

I claim:

1. A vehicle occupant blast isolation system for use with a vehicle, said vehicle having a body structure, an occupant seat and a seat support structure that supports the seat on the body structure, said system comprising:
   one or more blast sensors positioned on the body structure to detect a blast wave of an explosive event proximate the vehicle;
   one or more explosive charges positioned on the seat support structure;
   a first circuit coupled to the one or more sensors to initiate the explosive charges in response to a detected blast wave, said initiation of the explosive charges severing the mechanical linkage between the seat and body structure placing the seat and occupant in free-fall for a period of time spanning the coupling of the shock from the blast wave to the body structure;
   a plurality of rocket motors positioned about the vehicle's body structure;
   one or more rotation sensors positioned on the body structure to measure rotation of the body structure; and
   a second circuit coupled to the one or more blast sensors and one or more rotation sensors to initiate one or more of the rocket motors in response to the detected blast wave and the measured rotation of the body structure to counter said rotation.

2. The system of claim 1, wherein the one or more blast sensors comprise light sensors that detect a flash of light associated with the explosive event that precedes the blast wave.

3. The system of claim 1, wherein the one or more blast sensors comprise first accelerometers that sense an acceleration associated with the blast wave.

4. The system of claim 3, wherein the one or more rotation sensors comprise the same first accelerometers, which detect the blast wave and measure the rotation of the body structure.

5. The system of claim 3, wherein said first and second accelerometers measure accelerations in respective ranges that are separated by at least two orders of magnitude.

6. The system of claim 1, wherein said first circuit is responsive to both the amplitude and rise time of the response of the one or more blast sensors.

7. The system of claim 1, wherein at least a plurality of the rocket motors are positioned on top of the vehicle's body structure to produce a downward force on the body structure.

8. The system of claim 1, wherein each said rocket motor produces a fixed impulse response, said second circuit controlling the selection and timing of the initiation of said rocket motors to counter said rotation.

9. The system of claim 1, wherein said second circuit initiates one set of one or more of the rocket motors in response to a single measurement of rotation to counter said rotation.

10. The system of claim 1, wherein said one or more rotation sensors provide a time sequence of rotation measurements, said second circuit initiating different sets of said one or more rocket motors in response to each rotation measurement to counter said rotation.

11. A vehicle occupant blast isolation system for use with a vehicle, said vehicle having a body structure, an occupant seat and a seat support structure that supports the seat on the body structure, said system comprising:
    one or more blast sensors positioned on the body structure to detect a blast wave of an explosive event proximate the vehicle;
    one or more explosive charges positioned on the seat support structure;
    a first circuit coupled to the one or more sensors to initiate the explosive charges in response to a detected blast wave, said initiation of the explosive charges severing the mechanical linkage between the seat and body structure placing the seat and occupant in free-fall for a period of time spanning the coupling of the shock from the blast wave to the body structure;
    a plurality of rocket motors positioned about the vehicle's body structure; and
    a second circuit coupled to the one or more blast sensors to initiate one or more of the rocket motors in response to the detected blast wave to produce a nominal pre-determined response to counter a rotation of the body structure.

12. A vehicle occupant blast isolation system for use with a vehicle, said vehicle having a body structure, an occupant seat and a seat support structure that supports the seat on the body structure, said system comprising:

- one or more blast sensors positioned on the body structure to detect a blast wave of an explosive event proximate the vehicle;
- one or more explosive charges positioned on the seat support structure; and
- a circuit coupled to the one or more sensors to initiate the explosive charges in response to a detected blast wave, said initiation of the explosive charges severing the mechanical linkage between the seat and body structure placing the seat and occupant in free-fall for a period of time spanning the coupling of the shock from the blast wave to the body structure.

* * * * *